US009997924B2

(12) United States Patent
McDaniel et al.

(10) Patent No.: US 9,997,924 B2
(45) Date of Patent: Jun. 12, 2018

(54) HYBRID ENERGY SYSTEM AND METHOD

(71) Applicant: Wellhead Electric Company, Inc., Sacramento, CA (US)

(72) Inventors: John Grant McDaniel, Sacramento, CA (US); Harold Edwin Dittmer, Sacramento, CA (US)

(73) Assignee: WELLHEAD ELECTRIC COMPANY, INC., Sacramento, CA (US)

( * ) Notice: Subject to any disclaimer, the term of this patent is extended or adjusted under 35 U.S.C. 154(b) by 0 days. days.

(21) Appl. No.: 15/663,785

(22) Filed: Jul. 30, 2017

(65) Prior Publication Data
US 2017/0331298 A1 Nov. 16, 2017

Related U.S. Application Data

(63) Continuation-in-part of application No. 14/497,685, filed on Sep. 26, 2014, now Pat. No. 9,722,426.

(60) Provisional application No. 61/898,866, filed on Nov. 1, 2013, provisional application No. 61/882,899, filed on Sep. 26, 2013.

(51) Int. Cl.
*H02J 1/10* (2006.01)
*H02J 3/46* (2006.01)
*H02J 3/32* (2006.01)

(52) U.S. Cl.
CPC . *H02J 3/46* (2013.01); *H02J 3/32* (2013.01)

(58) Field of Classification Search
CPC .............. H02J 3/32; H02J 3/46; H02J 3/381

USPC .......................................... 307/43
See application file for complete search history.

(56) References Cited

U.S. PATENT DOCUMENTS

| 5,563,802 | A  | 10/1996 | Plahn et al. |
| 6,703,719 | B1 | 3/2004  | McConnell |
| 2010/0013315 | A1 | 1/2010 | Halvarsson |
| 2010/0292853 | A1 | 11/2010 | McDonnell |
| 2011/0208365 | A1 | 8/2011 | Miller |
| 2013/0015703 | A1 | 1/2013 | Rouse et al. |
| 2014/0097683 | A1 | 4/2014 | Piyabongkarn et al. |

FOREIGN PATENT DOCUMENTS

WO      2016/049488 A1    3/2016

OTHER PUBLICATIONS

Miller, et al., "California ISO (CAISO) Frequency Response Study", GE Energy Consulting, 114 pages, (Nov. 9, 2011).

*Primary Examiner* — Carlos Amaya
(74) *Attorney, Agent, or Firm* — The Marbury Law Group, PLLC

(57) ABSTRACT

Various embodiments include systems and methods of operating a hybrid energy system that includes a gas-turbine generator configured to provide a full-load power output and a storage device configured to store energy. The hybrid energy system includes a generator step-up transformer, wherein the gas-turbine generator and the storage device are electrically co-located on a low side of the generator step-up transformer. Methods of operation include controlling power output from the storage device and/or the gas-turbine generator during scheduled and unscheduled grid power demands to achieve economic and environmental performance advantages.

5 Claims, 7 Drawing Sheets

HYBRID ENERGY SYSTEM AND METHOD

CLAIM OF PRIORITY

This application is a continuation-in-part of U.S. patent application Ser. No. 14/497,685 entitled "HYBRID ENERGY SYSTEM AND METHOD" filed Sep. 26, 2014, which claims the benefit of priority of U.S. Provisional Patent Application Ser. No. 61/882,899, filed on Sep. 26, 2013 and U.S. Provisional Patent Application Ser. No. 61/898,866, filed on Nov. 1, 2013, all three of which are herein incorporated by reference in their entirety.

BACKGROUND

Energy facilities are designed to provide energy to an electric grid in a reliable manner. One example of an energy facility includes a gas fired generation system, such as a gas turbine generator (GTG), configured to provide energy to the electric grid while maintaining the frequency and voltage of the electric grid within acceptable limits, such as limits set by a government body, a regulatory body, transmission grid operations, or an energy facility. Electric grid demands change depending on a number of factors including weather, market demands, and other reliability driven events. The energy facility is typically designed to ramp up, including starting, or ramp down in response to these factors.

One example of an energy facility includes a combined cycle gas turbine (CCGT) configured to remain on-line a substantial majority of the time in order to respond to the electric grid reliability factors.

SUMMARY

The following is a brief summary describing a system and method to combine electric storage and gas-fired generation into a single hybrid energy facility when viewed from the grid. The hybrid design is especially well suited for locations near load centers as it displaces the need to have thermal generation running in the local area on an almost continuous basis to provide the required inertia, energy and other services necessary to ensure grid reliability. The hybrid facility can provide the necessary reliability with a significantly reduced emissions profile and at a lower overall cost. The fast acting hybrid facility also has excellent power conditioning and ramping capabilities which are vital to supporting the grid as well as the continued growth of renewables such as wind and solar. The hybrid can be less onerous to the site than new gas only projects of equivalent size.

BRIEF DESCRIPTION OF THE DRAWINGS

In the drawings, which are not necessarily drawn to scale, like numerals may describe similar components in different views. The drawings illustrate generally, by way of example, but not by way of limitation, various embodiments discussed in the present document.

DETAILED DESCRIPTION

Figure 1:
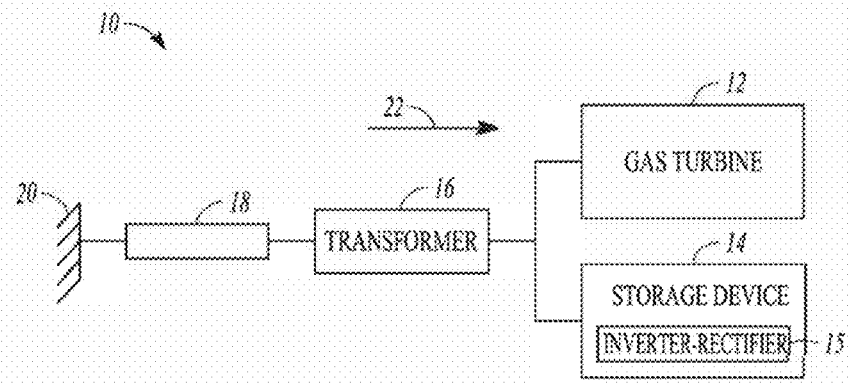
FIG. 1 is a block diagram of one example of a hybrid energy system, according to the present disclosure.

The present inventors have recognized, among other things, that a problem to be solved can include reducing response times of a GTG, such as starting, ramping up, or ramping down, to an electric grid reliability factor. One example of an energy facility includes a simple cycle GTG that is most commonly configured to be in a stand-by state, ready to start and operate only when called upon, resulting in a lesser response capability to electric grid reliability factors. Energy facilities are typically designed to meet some combination of energy and electric grid reliability needs. Tradeoffs are typically made between one or more of size, amount of energy that can be produced, efficiency, time to start, rate of capability to ramp output up or down, ability to operate at low power output levels relative to maximum output levels, and ability to provide products that support reliability, such as ancillary services and reserves.

Ancillary services typically include operating reserves that are set aside for specific types of reliability events including, but not limited to: Regulating reserves—typically regulation is provided by synchronized generation and is dedicated to maintaining the frequency of the electric grid; Spinning reserves—typically provided from the unloaded portion of a synchronized generator, spinning reserves are immediately available to arrest a frequency excursion; Non-spinning reserves—typically provided by off-line generating units in a stand-by state that can start and ramp up their energy output within 10 minutes to restore electric grid frequency after it has been arrested by spinning reserves; Voltage support—typically provided by on-line generation, synchronous condensers and inverter systems, voltage support systems maintain electric grid voltage and reactive load (VAR); and Black-start—typically provided by energy facilities with the capability to start and generate electricity without aid from the electric grid. These units are available to re-start the electric grid following black-out conditions. The quality of these operating reserves has a direct impact on electric grid reliability.

In an example, the present subject matter can provide a solution to this problem, such as by a hybrid energy system that aggregates and integrates a storage system, such as a battery and a GTG, to combine the features of each into a responsive system. For example, the present subject matter provides hybrid energy systems configured to be responsive, so as to provide higher quality reserves by at least one of speed, rate, magnitude, and duration of the response a to transient event. By providing a responsive hybrid energy system, the present subject matter economically reduces response times of a GTG. Economically reducing response times includes at least one of reducing the overall start-up time or ramp time to the desired load, reducing the time to respond to a frequency disturbance, as described herein, and reducing the production of pollutants during start-up or ramping, resulting in higher quality reserves. In another example, the present subject matter includes a battery having substantially immediate discharge capability and a GTG that can rapidly start and supplement the power output of the battery in the matter desired by electric grid operators. In another example, the present subject matter can provide a solution to this problem, such as by a hybrid energy system having a GTG configured to have a fast-start, fast ramp capability in combination with a substantially immediate discharge capability from a storage device, such as a battery. Such examples provide the benefit of reducing the time the hybrid energy system responds to a change in electric grid demand.

The present inventors have further recognized that another problem to be solved can include reducing an amount of pollutants produced by an energy facility (such as a CCGT) remaining on-line to respond to electric grid demands. In one example, the present subject matter can provide a solution to this problem, such as by a hybrid energy system that includes a storage system, such as a battery, that is synchronized and ready to respond to electric grid reliability factors, ramp up, and provide substantially immediate energy for a limited period of time and a GTG in a stand-by state (e.g., off-line but substantially immediately ready to start) which significantly reduces or eliminates the production of pollutants when the GTG is not designated to provide energy to the electric grid. An off-line GTG is considered to be a GTG in a non-power producing state. Benefits of such an example include staging the GTG for a fast-start response to an electric grid demand while reducing or eliminating the pollutant profile of the hybrid energy system when not providing energy to the electric grid.

The present inventors have further recognized that another problem to be solved can include reducing the cost of providing reliability and energy services produced by an energy facility. Hydro-carbon based energy, such as burning or combusting of natural gas, can be an expensive, non-economic energy product approach, as compared to alternative forms of energy production. The present subject matter, in one example, can provide a solution to this problem, such as by leveraging market shifts to store energy in a storage device configured to substantially immediately discharge the energy to aid in the fast-start capability of the GTG, as well as provide energy to the electric grid in response to electric grid demands. In an example, the present subject matter can provide a solution to this problem, such as by remaining off-line so as to not produce energy when it is non-economical.

FIG. 1 shows one example of a block diagram of a hybrid energy system 10, including a generator step-up transformer 16, a GTG 12, and a storage device 14. The step-up transformer 16 is configured, in an example, to convert the output of the GTG 12, the storage device 14, or both, to a higher voltage prior to being provided to an electric grid 20, where electric grid impedance is represented by block 18. Although FIG. 1 shows only one GTG 12 and one storage device 14, examples are not so limited. For example, the hybrid energy system 10 can include one or more GTG 12 coupled to one or more storage devices 14. That is, the GTG 12 can be coupled to a plurality of the storage devices 14 or a plurality of the GTGs 12 can be coupled to a plurality of the storage devices 14, such as an energy storage bank. As shown, the storage device 14 is coupled to the GTG 12 and each are electrically co-located on a low-side 22 of the generator step-up transformer 16. In an example, the electrical co-location of the GTG 12 and the storage device 14 permits the hybrid energy system 10 to be operated as either a single generation or non-generation resource (e.g., storage) with an operating range from the full negative capacity of the one or more storage device to the combined positive capacity of the storage device and the GTG. As discussed herein, electrically co-locating the GTG 12 and the storage device 14 allows for the faster responding inverter-rectifier 15 of the storage device 14 to aid the GTG response time in the event of electric grid frequency transients. Likewise, the same electrical co-location allows the inverter-rectifier 15 ability to ride through transients in electric grid voltages provided that the GTG 12 is on line.

In an example, the system 10 is located in multiple geographic locations, such that the GTG 12 can be separated from storage device 14. That is, the footprint of the hybrid energy facility is not limited to a single contiguous location, provided that the GTG 12 and the storage device 14 are electrically co-located at the same point on the electric grid 20 (e.g., the low side 22 of the step-up transformer 16).

GTG

The GTG 12 is configured to provide a power output, including up to a full-load power output. In an example, the GTG 12 includes a turbine, such as an aero-derivative or heavy-duty gas turbine having the full-load power output anywhere from about 10 MW to about 350 MW or more. The GTG 12, in an example, is configured for a fast start, such as about 20 minutes or less, about 10 minutes or less, about 5 minutes or less, or about 2 minutes or less. Starting the GTG 12 includes from the stand-by state (e.g., off-line but substantially immediately ready to start) to a desired load of the GTG, including up to full-load power output. Off-line includes, in an example, a non-power producing state of a GTG. In an example, the stand-by state of the GTG 12 includes the GTG 12 off-line, but substantially immediately ready to start. In an example, the GTG 12 includes an auto-start feature configured to start the GTG 12 in response to a frequency disturbance event. That is, in an example the hybrid energy system 10 is configured to provide the GTG 12 droop-like capability when off-line in response to a frequency disturbance event, such as a transient or decay in frequency. This example also allows for the inverter-rectifier 15 of the storage device to supply voltage support with the GTG 12 in the stand-by state. In an example, the GTG 12 can include a clutch between the gas turbine and the generator, so as to provide substantially synchronous condensing. Such a configuration permits the system 10 to provide a substantially continuous and a substantially immediate response to electric grid transient voltage events, which can be accomplished without burning fuel or creating combustion emissions.

In some embodiments, the GTG 12 may implement super-low minimum power (Pmin) technology that may enable the GTG to maintain a gross Pmin of no greater than the total hybrid facility parasitic load, such as about 0.5 MW. By deploying the super-low Pmin technology in the GTG 12, the hybrid facility can be capable of having the gas turbine online serving parasitic loads while the net output of the facility is approximately zero MW or even negative, such as receiving some power from the grid for charging one or more batteries. This configuration allows for an immediate (e.g., "spinning reserve") response from the entire facility without putting uneconomic or unwanted energy to the grid. Thus, this configuration enables the GTF to be online and synched to the grid without affecting the net power output to the grid.

Storage Device

The storage device 14 is configured to store energy. In an example, the storage device 14 includes a battery, such as a fast acting battery system, including an inverter-rectifier 15 to convert direct current (DC) energy being discharged from the storage device 14 to alternating current (AC) energy required by the electric grid 20 or AC energy being produced from either the electric grid 20 or the GTG 12 into DC energy stored in the storage device 14. In an example, the inverter-rectifier 15 is, but is not limited to, a four quadrant inverter. In an example, the storage device 14 is configured to respond or provide power (e.g., at least a portion of the stored energy) in about 60 seconds or less, about 30 seconds or less, about 10 seconds or less, about 5 seconds or less, about 2 seconds or less, 1.0 seconds or less, 0.5 seconds or less, or 0.1 seconds or less. In an example, the storage device 14 and associated inverter-rectifier is configured to receive (e.g., charge) and provide (e.g., discharge) energy.

In an example, the storage device 14 is configured to be charged by the electric grid 20, such as when electric grid market costs are lower than the cost of producing energy with the GTG 12 (e.g., the GTG charging cost). The grid market cost is at least one of the environmental, monetary, and other costs associated with obtaining power from the electric grid 20 and the GTG charging cost is at least one of the environmental, monetary, and other costs associated with producing power at a set fuel cost and heat rate of the GTG. In another example, the storage device 14 is configured to be charged by the GTG 12 when the electric grid market costs are more expensive than the cost of producing energy with the GTG 12. In an example, both the electric grid 20 and the GTG 12 can be used to charge the storage device 14. In an example, a portion or all of the GTG 12 output is converted to DC and delivered to a DC bus of the storage device 14 and the inverter-rectifier 15 to allow for further improvement in the primary frequency response, as described herein. Primary frequency response includes, for example, a response within about 30 seconds of the event that is meant to arrest a frequency disturbance. The GTG 12 includes, in an example, frequency response auto start capability, such that when the GTG 12 is in the stand-by state the output of the storage device 14 is substantially immediately increased and the GTG 12 auto starts in the event of an electric grid frequency decay or transient. In an example, the hybrid energy facility 10 includes a waste heat recovery generator. The waste heat recovery generator, in an example, is based upon the Organic Rankine Cycle and substantially all output is converted to DC and flows to the DC bus of the storage device inverter-rectifier 15.

In an example, the storage energy can be any capacity as long as the storage device 14 is capable of maintaining and providing the minimum stored energy necessary to provide primary frequency response during the time period while the GTG 12 is started and ramped to a desired load, such as an operator load set-point, up to and including full-load. In an example, the storage device 14 has an energy storage capacity of at least about 5% of the full-load power output up to about 100% of the full-load power output of the GTG 12. Further, the storage device 14, in an example, includes a plurality of inverter-rectifier 15 having at least 10% of the full-load power output of the GTG 12.

In another example, the storage device 14 has an energy storage capacity approximately equal to or greater than the full-load power output of the GTG 12. That is, the storage device 14 at least has, in an example, approximately the same immediate power discharge capability as the GTG 12 when started and fully loaded. As described herein, the storage device 14 provides a short-term substitution of the GTG 12 full generation capacity. In an example, the stored energy capacity of the storage device 14 is at least about 30 minutes, about 1 hour, about 1.5 hours, about 2 hours, or about 4 hours or longer of power discharge at or beyond the full-load power output of the GTG 12.

Hybrid Management System (HMS)

The hybrid energy system is governed by an HMS which ensures that the facility can deliver the desired product at the desired time in a cost-efficient manner. The HMS may receive its Real Time (RT) dispatch instructions directly from the Operator. The Operator may be located remotely from the hybrid facility and may be a function of any entity, or automated system as may be defined in an off-take agreement. It may be the duty of the Operator to respond to the economic and reliability instructions from the grid operator. The HMS may be configured to follow the instruction as received by the Operator and ensure that the net output of the plant is at the instructed point at the instructed time. The HMS may do so in a manner that considers the remaining daily needs and economics. The HMS may integrate market knowledge, operational knowledge, or both to prepare the system so that it is positioned to efficiently respond to signals from the Operator in accordance with any off-take agreement that might exist.

The HMS may include feed-forward and feedback loops to govern at least one of the facility conditions, including state of charge (SOC) of the battery, start and stop the gas turbine, and govern the ramp rate of the net plant output. The HMS can determine a number of factors, including: Excepted Delivery Schedules (EDS) from the market awards and schedules provided by the Operator; the timing for battery charge based upon market or contract prices; and the least cost method to deliver scheduled energy by optimizing information from the life-cycle costs and operational limits envelopes against the EDS and required ramp rates by product type. In this way, the HMS may function much like the embedded software in a hybrid vehicle when it responds to a signal from the accelerator or brake, except that the HMS has more anticipatory logic. The HMS will make decisions and issue instructions to start and stop the GTG, charge the battery, and ramp the plant at specified ramp rates. The HMS can start and stop the gas turbine as required in such a way as to keep the output linear as required.

The hybrid energy system may also include power electronics associated with power conversion and balance of plant equipment, including the AC portion of the plant, controls, switchgear, and the like, some or all of which may be controlled or partially controlled by the HMS.

Configurations

In various embodiments, both the gas turbine and the battery inverter are connected on the low side of the same Generator Step-Up (GSU) transformer. This enable an immediate response from the inverter to grid frequency disturbances, and thus enables the GTG 12 to have increased ride-through capability during grid frequency disturbances when the GTG is operating in a minimum power mode.

In an example, a portion or all of the gas turbine output may be converted to direct current (DC) and delivered to a DC bus of the battery inverters to allow for even further improvement in the primary frequency response. Additionally, the gas turbine may be equipped with a frequency-response auto-start capability for those instances when the GTG 12 is not running. The start times for the gas-fired turbine generator may be integrated into the ramp rate of the energy storage system such that the gas-fired generation start time is non-apparent to the total facility output. Maintaining a gas-fired generation gross Pmin of no greater than the total facility parasitic load allows the gas-fired generation to be online and available for immediate response without affecting the hybrid facility net output and without requiring market uplifts for minimum load cost recovery.

The configurations described below are examples that use the system as described relative to FIG. 1.

Enhanced GTG (EGT)

In an example, the hybrid energy system 10 is configured to use the storage device 14 to enhance the operational characteristics of the GTG 12. For example, the stored energy capacity of the storage device 14 is used as spinning reserve and is used to provide initial primary frequency response while starting the GTG 14 from the stand-by state up to a desired load output of the hybrid energy system (e.g., operator load set-point), such as up to and including full-load power output. In an example, stand-by state includes a non-fuel burning mode, in which little fuel to no fuel is combusted. During periods when the electric grid 20 is operating within its normal operating limits, such as operating limits for frequency or voltage established by transmission or distribution operators, the GTG 12 is configured to remain in the stand-by state (e.g., off-line, but ready to substantially immediately start). In such an example, the storage device 14 remains on-line, and primary transient protection is provided by the stored energy and inverter-rectifier 15 of the storage device 14. For example, the hybrid energy system 10 may be configured to start the GTG 12 from the stand-by state to the desired load output, such as the full-load power output, in about 20 minutes or less, about 10 minutes or less, about 5 minutes or less, or in a about 2 minutes or less.

When an electric grid transient occurs, the stored energy of the storage device 14 is used for transient protection, such that the GTG 12 starts, such as substantially instantaneously and at least a portion of a stored energy of the storage device 14 is transferred to the electric grid. In the instance where the electric grid 20 requires additional economic energy, the gas fired generator can be started and loaded without the use of the storage device 14.

The storage output of the storage device 14 does not need to be additive to the GTG 12 output, but rather provides (e.g., substantially instantaneously) output until the GTG 12 can deliver the necessary output to provide a substantially similar ramp curve as the GTG 12 alone, as described herein. That is, the storage device 14 can be slaved to a total output of the hybrid energy system 10 such that the storage device 14 discharges the difference between the desired expected output if the GTG 12 was initially synchronized and the actual GTG output, on a net basis. For example, the EGT configuration enhances the GTG 12 such that the hybrid energy system is operated in a smooth, continuous fashion with a single monotonically increasing energy supply curve.

In an example, as opposed to being in the stand-by state, the GTG 12 is configured to operate at a minimum power output of less than about 5%, less than about 3%, or less than about 1% of the full-load power output of the GTG 12. The minimum power output is the minimum output at which the GTG 12 can stably operate. In such a configuration, for example, the storage device 14 has a stored energy capacity of at least about 5% of the full-load power output up to about 100% of the full-load power output of the GTG. In such an example, when an electric grid transient occurs, the stored energy of the storage device 14 is used for transient protection, such that the GTG 12 ramps, such as substantially instantaneously and at least a portion of a stored energy of the storage device 14 is transferred to the electric grid. In the instance where the electric grid 20 requires additional economic energy, the gas fired generator can be started and loaded without the use of the storage device 14.

Figure 2:
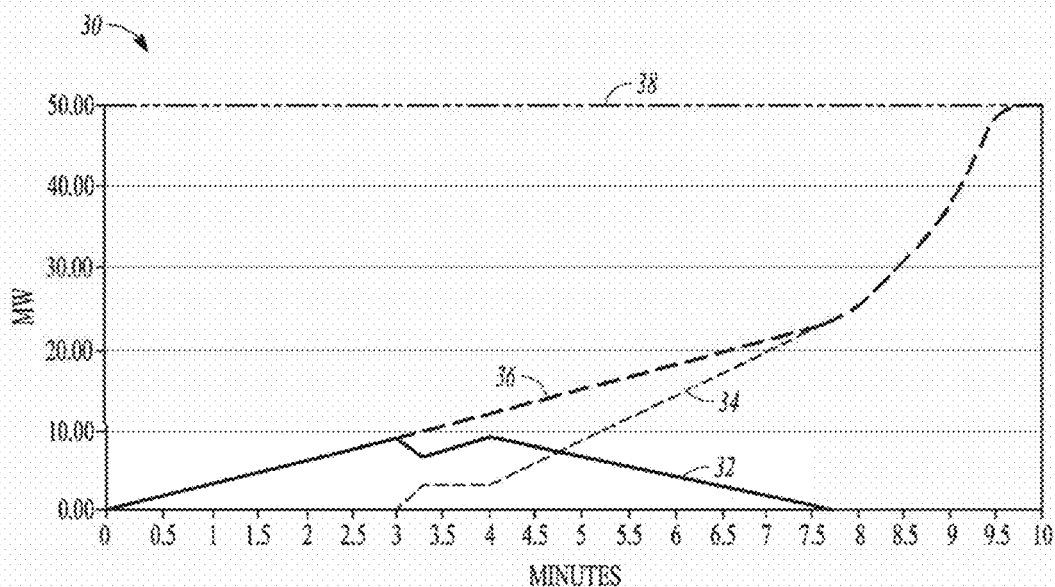
FIG. 2 is a plot of one example of a hybrid energy system start profile, according to the present disclosure.

FIG. 2 shows a plot 30 of one example of a hybrid energy system start profile, according to the present disclosure. The values represented in FIG. 2 are merely for example purposes and are not limiting. For example, FIG. 2 illustrates the start of the GTG (12, FIG. 1) and the subsequent ramping of the GTG in an EGT system configuration. In the plot 30, the y-axis represents power output in megawatts (MW) and the x-axis representing elapsed time in minutes. Although, specific power output, power storage, and times are shown, they are to be understood as exemplary only and do not limit the current disclosure. The hybrid energy system plotted in plot 20 includes a storage device with an energy storage capacity of at least about 10% of the full-load power output of the GTG. Further in the example plotted in FIG. 2, the storage device includes an inverter-rectifier having at least 20% of the full-load power output of the GTG 12.

At time T=0 minutes the hybrid energy system (10, FIG. 1) receives a command, such as detection of a transient event, market event, or the like, to start and ramp the GTG to a desired load 38 of 50 MW. In an example, the desired load 38 is a desired load output for the hybrid energy system or the desired load output of the GTG. The desired load 38 can be partial full-load output of the GTG or full-load output of the GTG. Further, as described above, the GTG is in the stand-by state. As shown by line 32, the storage device (14, FIG. 1) discharges at least a portion of the stored energy capacity substantially simultaneously to the delivery of a command to start the GTG. As shown in plot 30, a total hybrid energy system output 36 is substantially equal to the storage device output 32 from time T=0 minutes to T=3 minutes. That is, the storage device output 36 is equal to the total hybrid energy system output 36 when the GTG output 34 is zero MW (e.g., initiating a start sequence). The storage device output 32 from time T=0 minutes to time T=3 minutes follows a ramping profile (e.g., slope of 32) similar (e.g., continually increasing toward the desired load 38) to that as if the GTG were to ramp alone from an on-line mode and synchronized, such as a total hybrid energy system output 36. However, unlike the ramping of an on-line GTG, the discharge of the storage device does not result in the production of emissions, including, but not limited, to air pollutants, such as greenhouse gases. Further, substantially simultaneously to the storage device discharging at least a portion of its stored energy, the GTG initiates its start sequence, indicated by line 34.

As an example, shown by GTG output 34, the GTG generator synchronization, loading profile, and warm-up sequence is initiated at about time T=3 minutes until about time T=4 minutes. As shown, at time T=3 minutes the storage device reduces its output 32 as the GTG begins to provide positive GTG load output 34 to the total hybrid energy system output 36. The plot 30 illustrates a minimum standard for the ramp profile of the total hybrid energy system output 36. Alternatively, the storage device output 32 can maintain a substantially constant positive ramp profile (e.g., slope of 32) from time T=3 minutes to time T=4 minutes or can maintain a substantially constant storage device output 32 (e.g., slope of zero). In an example, the total hybrid energy system output 36 is continually increasing toward the desired load 38 or has a ramp profile with a slope of zero for 1 minute or less while ramping to the desired load output. At time T=4 minutes, the GTG has warmed-up sufficiently to continue ramping the output 34 to the desired GTG load 38. Substantially simultaneously, the storage device reduces the storage device output 32 until it is no longer discharging, while maintaining a continually increasing the hybrid energy system output 36 towards the desired storage load 38. As shown in FIG. 2, in an example, a total hybrid energy system is configured, such as the EGT configuration, to start the GTG from the stand-by-state state to the full-load power output and discharge at least a portion of the stored energy of the storage device at a hybrid ramp rate that substantially matches a gas turbine alone ramp rate. Thus, the HMS integrates the GTG start time into the ramp rate of the output of the energy storage system such that the GTG start time is non-apparent in the total facility output. In an example, the single composite power output response of the hybrid energy system may transition from about −50 MW to about 100 MW.

In this manner, the EGT configuration can provide substantially continuous and substantially immediate responses to electric grid transients and contingencies without at least a portion of the undesired attributes of unnecessary fuel burn, unwanted pollutants, and unrequired energy contributed by the typical gas fired generation units of the current electric grid. For example, reducing unwanted pollutants may include reducing the pollutant profile (e.g., pollutants produced per MW, time, or unit of fuel).

Enhanced Storage (ES)

In an example, the hybrid energy system (10, FIG. 1) is configured to use the GTG (12, FIG. 1) to supplement the storage device (14, FIG. 1), such as, for example, maintain a state of charge of the storage device during operation of the hybrid energy system, such that the faster responding storage device is available to respond to an electric grid frequency transient. In an example, a portion or all of the GTG output may be converted to DC and delivered to a DC bus of the storage device, such as the inverter-rectifier (15, FIG. 1), to allow for even improvement (e.g., faster) in the primary frequency response. Additionally, in an example the GTG is equipped with a frequency response auto start capability for instances when the GTG is in the stand-by state. In an example, the hybrid energy system includes a waste heat recovery generator.

The ES configuration includes, in an example, the stored energy capacity of the storage device approximately equal to or greater than the full-load power output of the GTG. That is, the storage device at least has, in an example, approximately the same immediate power discharge capability as the GTG when started and fully loaded. As described herein, the storage device provides a short-term substitution of the GTG full generation capacity. In an example, the stored energy capacity of the storage device is at least about 15 minutes, about 1 hour, about 1.5 hours, about 2 hours, or about 4 hours or longer of power discharge at or beyond the full-load power output of the GTG.

Figure 3:
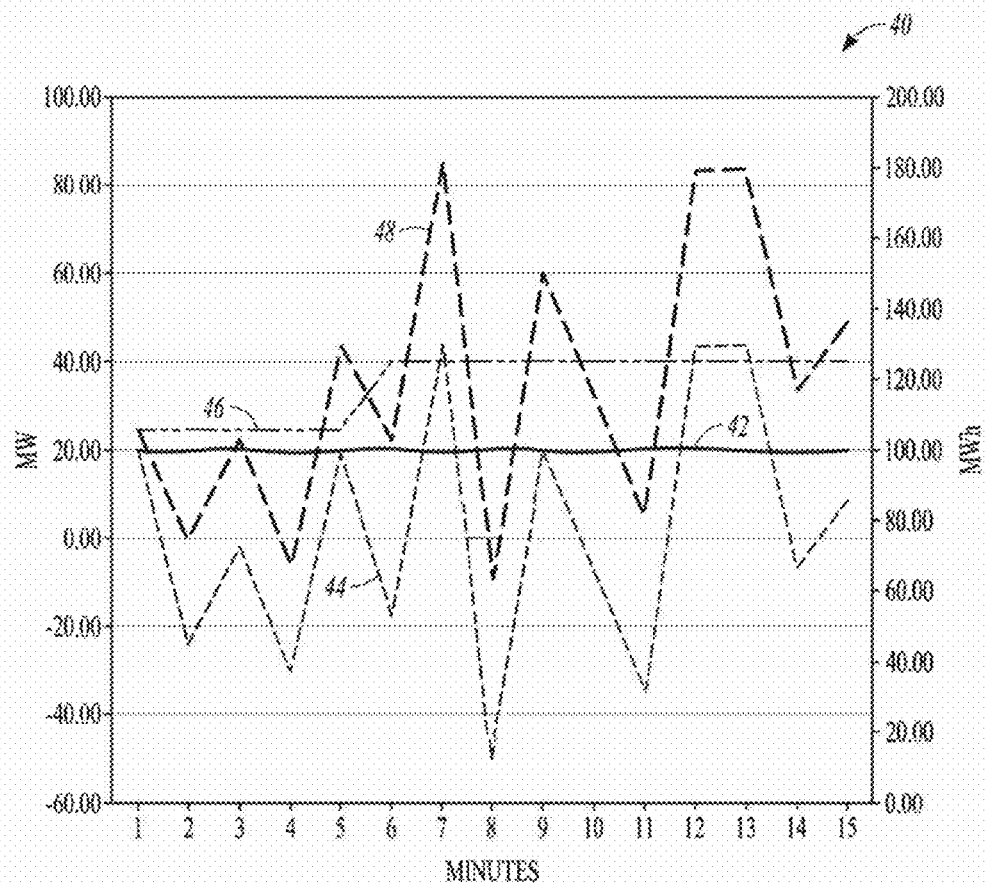
FIG. 3 is a plot of one example of an operation of the hybrid energy system, according to the present disclosure.

FIG. 3 shows a plot 40 of one example of an operation, such as regulation output, of the hybrid energy system, such as managing a state of charge of the storage device with the GTG, according to the present disclosure. The values represented by FIG. 3 and Table 1 are merely for example and are not limiting. In the plot 40, the left y-axis represents MW and pertains to lines 44, 46, and 48; the right y-axis represents MWh and pertains to line 42; the x-axis represents time in minutes and pertains to each line 42, 44, 46, and 48. As shown in FIG. 3, the GTG output 46, from about time T=1 minute to about time T=7 minutes is approximately a constant 25 MW. During this window of time (1 to 7 minutes) regulation ramping 48 varies significantly and randomly. In response to the varying regulation ramping 48, the storage device substantially immediately responds likewise in its discharge 44. For example, from time T=3 minutes to time T=4 minutes the regulation ramping 48 decreases and the storage device output 44 also decreases. This is accomplished by having the GTG output 46 in excess of the required regulation output. The excess energy is diverted to charging the storage device to maintain its state of charge 42 relatively constant at around 100 MWh. Similarly, when the regulation ramping increases 48, for example from time T=4 minutes to time T=5 minutes, the storage device output 44 increases the output to match the demand. As can be seen in FIG. 3, this relationship holds true even with the overall hybrid energy system output increases from approximately 25 MW to approximately 44 MW. In an example, the storage device is configured to respond (e.g., substantially simultaneously) before the GTG when the regulation demand is detected during operation of the hybrid energy system. By maintaining the state of charge 42 of the storage device, the hybrid energy system is capable of substantially immediately responding to operations, such as regulation, while the GTG is on-line.

As shown in FIG. 3, during fluctuations in regulation ramping 48, the state of charge of the storage device 42 remains substantially constant, approximately 100 MWh. This is accomplished by the charging and discharging of the storage device in response to each of the changes of the regulation ramping 48. Table 1 titled "Managing State of Charge with the GTG in FIG. 3" corresponds to the plot 40 including state of charge 42, storage device output 44, GTG output 46, regulation ramping 48. As shown in Table 1, from time T=1 minute to time T=5 minutes, the desired GTG output is 24 MW, allowing the GTG, assuming a 50 MW GTG for this example, to operate at half-power. However, at time T=5 minutes the regulation ramping increases to 43.4 MW. As such, the storage device output is substantially immediately increased to 19.4 MW to provide output in addition to the GTG output of 24 MW, so as to provide the regulation ramping output of 43.4 MW (e.g., 19.4 MW+24 MW=43.4 MW). Due to the higher load requirements initiated by the regulation ramping at time T=5 minutes, the GTG output is increased to 40 MW from time T=6 minutes to time T=10 minutes as shown by the positive slope of line 46 in FIG. 3. During that GTG ramping time frame from time T=6 minutes to time T=10 minutes, the storage device continues to respond to any regulation ramping. For example, at time T=6 minutes the regulation ramping decreased to 21.9 MW. However, the GTG has already begun increasing its output above 24 MW. The GTG output in excess of the regulation ramping output of 21.9 MW is provided to the storage device to maintain the storage device state of charge. For example, the storage device output is decreased to −18.10 MW (e.g., charging) while the GTG output is 40 MW, so as to provide the regulation ramping of 21.9 MW at time T=6 minutes (e.g., 40 MW+(−18.1 MW)=21.9 MW).

Further, as shown in Table 1, from time T=1 to time T=15 the total regulation ramping output for the example was 9.12 MWh. Although the storage device is configured to respond first to regulation ramping the total output for the storage device was 0.45 MWh, while the gas turbine output was 8.67 MWh. As shown by FIG. 3 and the corresponding Table 1 below, the storage device does the fast acting regulation and the GTG maintains the state of charge on the storage device so that the storage device continues to responding at fast rate without the charge of the storage device being depleted.

TABLE 1

Managing State of Charge with the GTG in FIG. 3

| Time (minute) | Storage Device Output 44 (MW) | GTG Output 46 (MW) | Regulation Ramping 48 (MW) | Storage Device Output (MWh) | GTG Output (MWh) | Regulation Ramping (MWh) | Storage Device State of Charge 42 (MWh) |
|---|---|---|---|---|---|---|---|
| 1 | 20.00 | 24.00 | 44.00 | 0.33 | 0.40 | 0.73 | 99.67 |
| 2 | −25.00 | 24.00 | −1.00 | −0.42 | 0.40 | −0.02 | 100.08 |
| 3 | −2.20 | 24.00 | 21.80 | −0.04 | 0.40 | 0.36 | 100.12 |
| 4 | −30.00 | 24.00 | −6.00 | −0.50 | 0.40 | −0.10 | 100.62 |
| 5 | 19.40 | 24.00 | 43.40 | 0.32 | 0.40 | 0.72 | 100.30 |
| 6 | −18.10 | 40.00 | 21.90 | −0.30 | 0.67 | 0.37 | 100.60 |
| 7 | 44.30 | 40.00 | 84.30 | 0.74 | 0.67 | 1.41 | 99.86 |
| 8 | −50.00 | 40.00 | −10.00 | −0.83 | 0.67 | −0.17 | 100.69 |
| 9 | 20.00 | 40.00 | 60.00 | 0.33 | 0.67 | 1.00 | 100.36 |
| 10 | −5.00 | 40.00 | 35.00 | −0.08 | 0.67 | 0.58 | 100.44 |
| 11 | −35.00 | 40.00 | 5.00 | −0.58 | 0.67 | 0.08 | 101.03 |
| 12 | 43.20 | 40.00 | 83.20 | 0.72 | 0.67 | 1.39 | 100.31 |
| 13 | 43.80 | 40.00 | 83.80 | 0.73 | 0.67 | 1.40 | 99.58 |
| 14 | −6.80 | 40.00 | 33.20 | −0.11 | 0.67 | 0.55 | 99.69 |
| 15 | 8.60 | 40.00 | 48.60 | 0.14 | 0.67 | 0.81 | 99.55 |
| Total MWH | | | | 0.45 | 8.67 | 9.12 | |

EGT, ES, Battery Only, and GTG Only Comparison

Table 2 entitled "Hybrid Energy System Example Configurations" below provides an example of an EGT configuration, an ES configuration, a Battery storage only configuration, and a GTG only configuration. As shown in Table 2, the EGT configuration is a substantial improvement over the GTG only configuration in that the operating range is extended at the lower end by approximately 50% and provides for emissions-free, electric grid reliability products until such time as the GTG is actually needed to respond to a reliability event. As further evidenced by Table 2, the ES configuration is a substantial improvement over the battery only in that its operating range is extended by approximately 50% at the upper end and provides for extended operating times.

TABLE 2

Hybrid Energy System Example Configurations

| | Enhanced GTG (EGT) | Enhanced Storage (ES) | Battery Storage Only | Gas Turbine Only |
|---|---|---|---|---|
| Pmin | 0.1 MW | −50 MW | −50 MW | 25 MW |
| Pmax | 49 MW | 99 MW | 50 MW | 49 MW |
| Primary Frequency Response | 49 MW | 99 MW | 50 MW | 24 MW |
| Emissions-Free Voltage Regulation | 10 MVAR | 50 MVAR | 50 MVAR | 0 MVAR |
| Emissions-Free Spinning Reserve | 49 MW | 99 MW | 50 MW | 0 MW |
| Energy Output | 49 MW for unlimited hours | 99 MW for 4 hours, 49 MW for unlimited hours | 50 MW for 4 hours | 49 MW for unlimited hours |
| Energy Heat Rate, BTU/kWh | 9,850 | Market heat rate capped at approximately 12,000 | Market rate | 9,850 |

ES Transient Response

Figure 4:
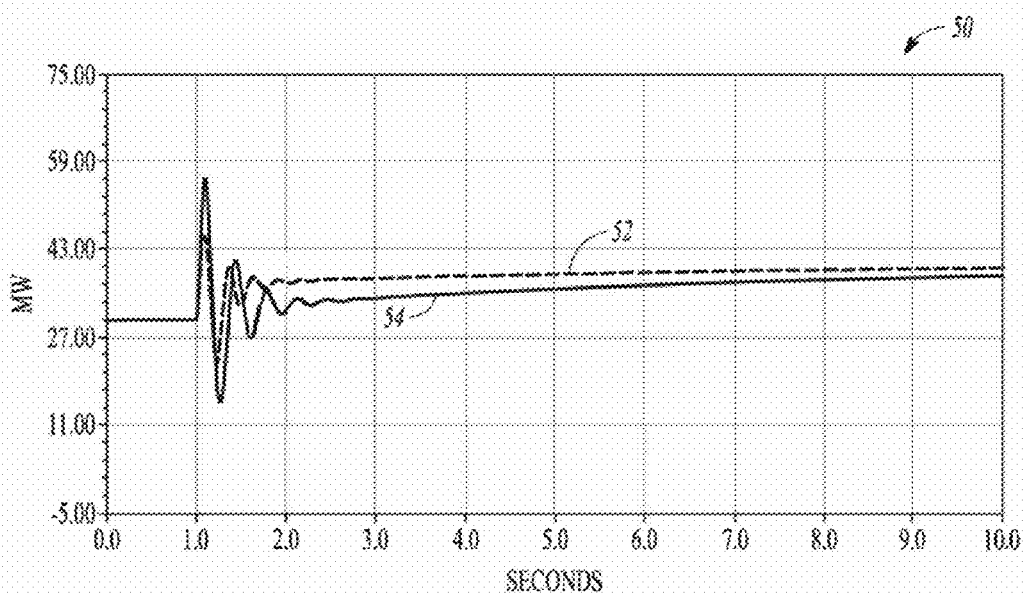
FIG. 4 illustrates a transient response of a hybrid energy system and gas turbine only system, according to the present disclosure.

FIG. 4 illustrates a transient response of an ES hybrid energy system configuration having a 50 MW GTG and a storage device having a 50 MW stored energy capacity compared to a 100 MW gas turbine only system. The ES hybrid energy system configuration is used for example and should not be construed as limiting the present subject matter to only such a configuration. FIG. 4 illustrates a plot 50 of a 0.3 hertz (Hz) frequency drop when a hybrid energy system and a gas turbine only system are on-line. As shown in plot 50, the ES hybrid energy system output 52 provides a faster primary frequency response than the 100 MW gas turbine only system output 54. As designed by industry standards, improved primary frequency response from the ES hybrid energy system is worth approximately three times that of an average synchronous GTG re-dispatched. As such, FIG. 4 illustrates that the ES hybrid energy system provides at least two times the frequency regulation service than the 100 MW gas turbine only system.

During periods when an electrical grid is operating within its normal operating limits, the gas fired generation system can remain off-line, such that primary transient protection can be from a storage system. If the storage system is required by the electrical grid to operate for transient protection, the gas fired generator (e.g., gas turbine) can start, such as substantially instantaneously, and at least a portion of a storage load of the storage system can be transferred to the gas fired generator upon synchronization of the gas fired generator. The storage output of the energy storage system does not need to be additive to the gas turbine output, but rather provides (e.g., substantially instantaneously) output until the gas turbine can deliver the necessary output. That is, the energy storage system can be slaved to the gas fired generation output such that the energy storage system discharges the difference between the facility Pmax and the actual gas fired generation output, on a net basis.

Figure 5:
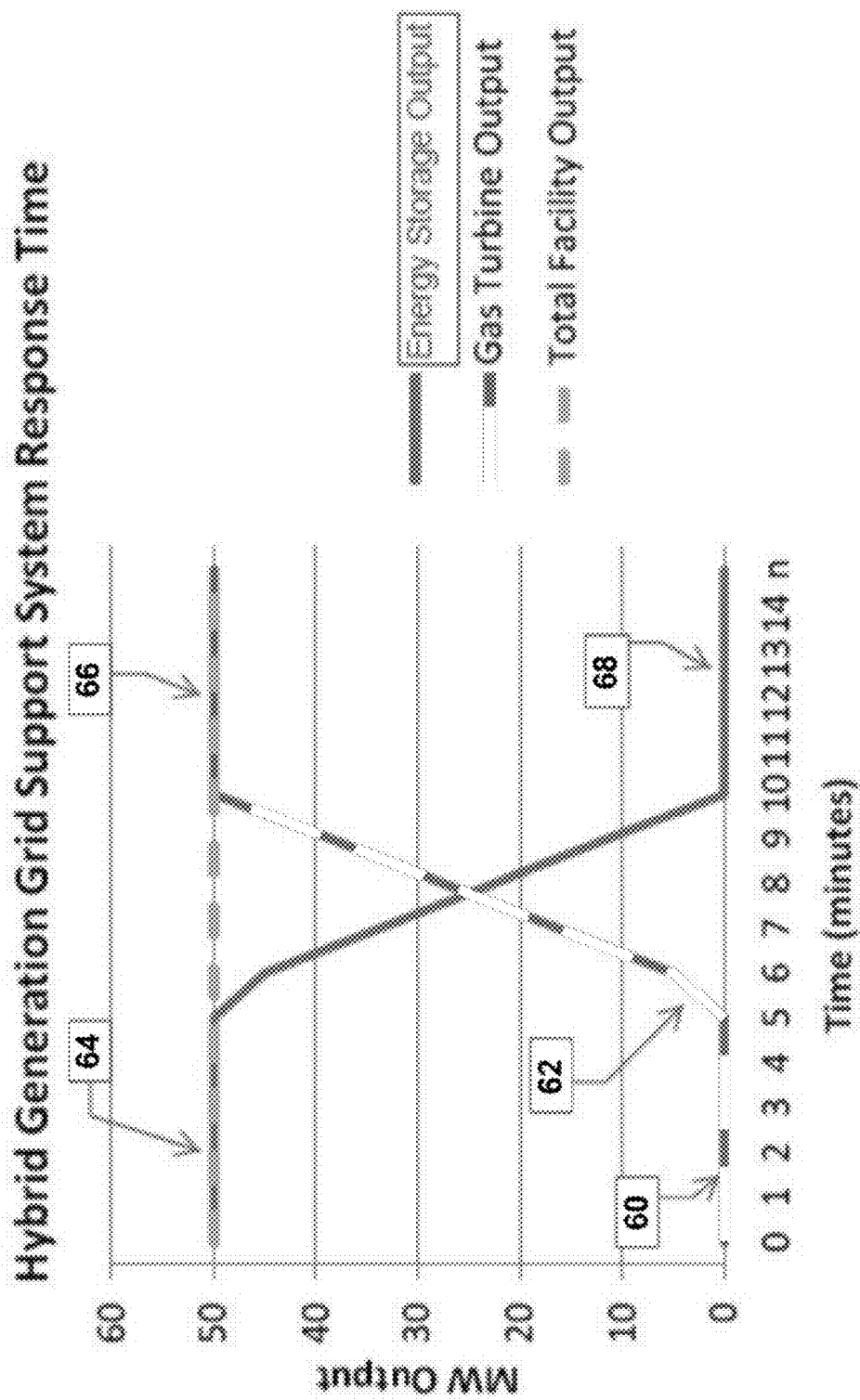
FIG. 5 is an example hybrid generation grid support system response time plot.

In FIG. 5, another example of a hybrid generation grid support system response time plot is shown, with the y-axis representing power output in megawatts (MW) and the x-axis representing elapsed time in minutes. Although, specific gas turbine power output, storage power output, and times are shown, they are to be understood as exemplary only and do not limit the current disclosure. As shown, from time 0 minutes to time 5 minutes the gas turbine's generator is in an off-line condition (60). During the same time period, the energy storage system produces 50 MW of energy output (64). Although FIG. 5 illustrates the energy storage capacity equal to the total facility output, embodiments are not so limited. For example, the energy storage capacity can be greater than the total facility output.

In the example illustrated in FIG. 5, at time 0 minutes a transient event occurs. As described herein, substantially instantaneously upon detection of the transient event the HMS may control the energy storage system to substantially immediately respond with its full output, drawing power from the energy storage system while the gas turbine initiates its start sequence (60). The gas turbine generator synchronization and loading profile (62) can be seen in FIG. 5 beginning at time 5 minutes. Once the gas turbine has completed its start sequence and is synchronized (time 5 minutes), the HMS will reduce the load drawn from the energy storage system at a rate that is inversely proportion to the net gas turbine generator output. That is, the HMS may control the power output by the energy storage system so that the slopes of the output of the energy storage system and the gas turbine generator from time 5 minutes to time 10 minutes are substantially equal but opposite. Thus, at time 10 minutes when the gas turbine output is substantially equal to the total facility output (66) there is no longer any output from the energy storage system (68). In this manner, this method can provide substantially continuous and substantially immediate responses to a system transient and contingencies without at least a portion of the undesired attributes of unnecessary fuel burn, unwanted pollutants, and unrequired energy contributed by maintaining the gas turbine generator spinning in a hot standby mode as is typical for current gas fired generation units providing standby power for the grid.

Various embodiments enable the hybrid energy system to be operated in a number of configurations and manners to provide operators with economic advantages. For example, the HMS may use a life-cycle cost envelope that includes the financial impact of starting, cycling, and running the gas turbine at minimum load. For example, the variable operating cost of running the hybrid energy system at its super-low Pmin can be used to partially offset the avoided cost of buying parasitic load at retail rates and the value of spinning or flexible capacity.

Figure 6:
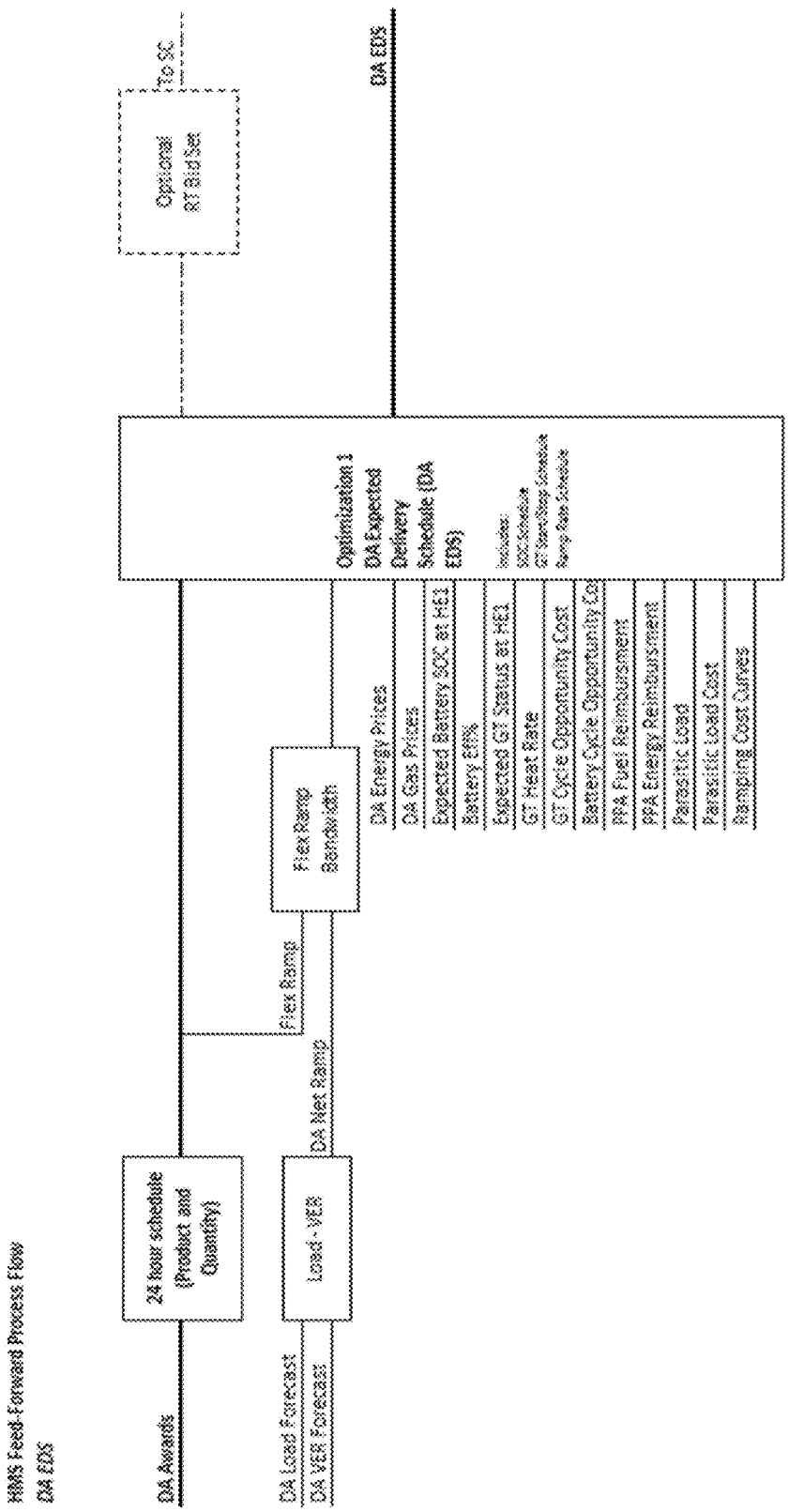
FIG. 6 is a process flow diagram of an example Hybrid Management System feed forward process based on a day ahead expected delivery schedule.
Figure 7:
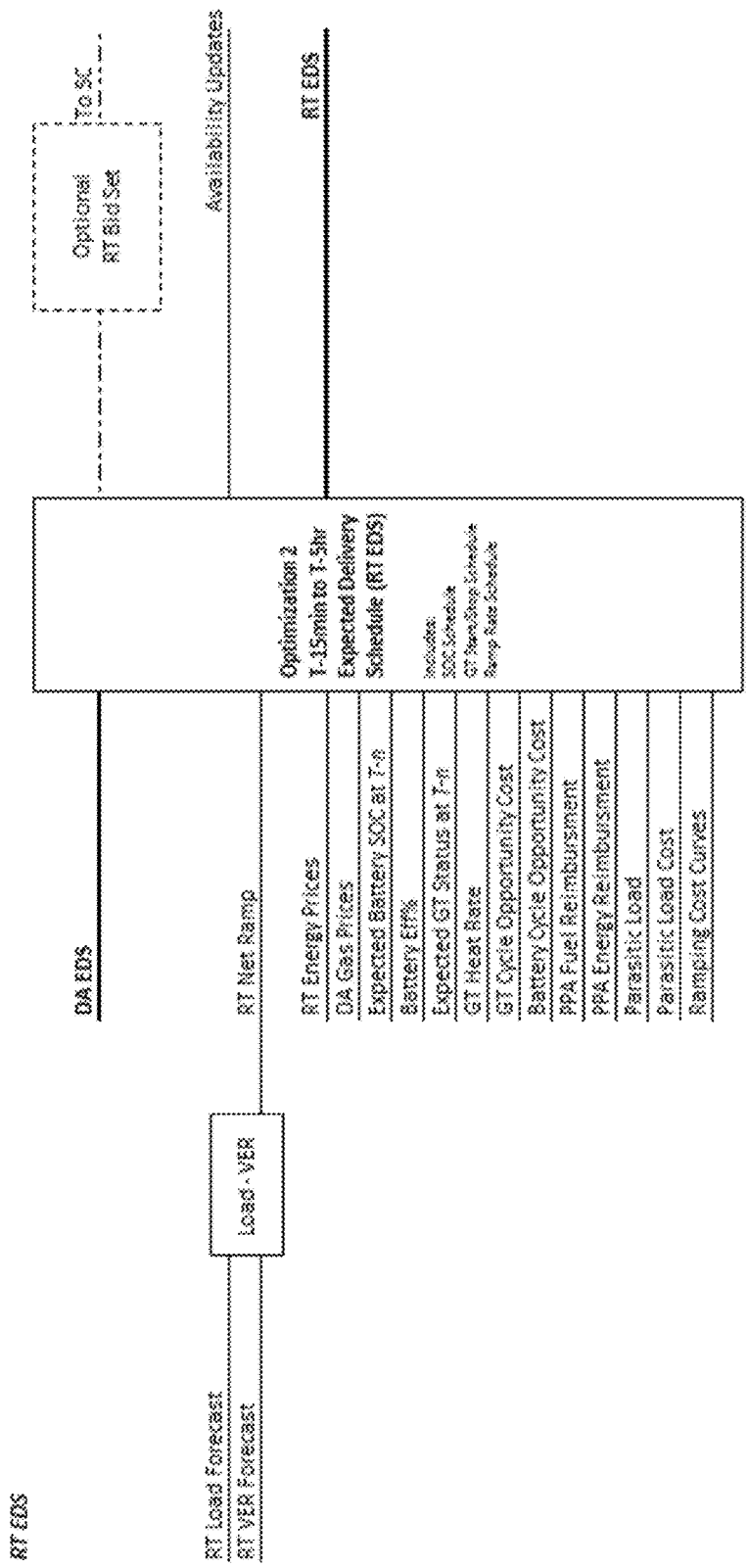
FIG. 7 is a process flow diagram of an example Hybrid Management System process for providing power according to an expected delivery schedule.

In electric markets with variable pricing, the feed-forward loop of the HMS may take inputs from at least one of Day-Ahead (DA) market awards, schedules, prices, DA load forecasts, Variable Energy Resource (VER) forecasts, GT/battery life-cycle, and operational envelopes, so as to provide an initial DA Expected Delivery Schedule (DA EDS), as illustrated in FIG. 6. The DA EDS may then be updated as required with information from the Real Time market (RI EDS) as illustrated in FIG. 7. The RT data may have a time horizon of one hour, two hour, three hour, four hour, five hour, six hour, seven hour, eight hour, nine hour, ten hour or more, which will run periodically, such as anywhere from about 5 seconds to 20 minutes or more, to correct the plan based upon at least one of the RT market awards, schedules and prices, RI load forecasts and RI VER forecasts and the GT/battery life-cycle and operational envelopes at intervals, such as about 5 hr, 4 hr, 3 hr, 2 hr, 1 hr, 15 minutes, or 5 minutes.

The initial expected energy schedule can be modified in real time by the feedback loop of the HMS, which takes inputs from the Operator or from the market awards for product type (e.g., energy, ancillary services, flex-ramp) which can govern at least one of the applied ramp rates, Dispatch Operating Target (DOT), 15 minute trajectory, plant control system for the current operator set-point for net plant output, battery SOC, GTG output, and actual plant net output. Once again, the HMS will be directed by the operator in response to market instruction from the bids and schedules per the off-take agreement or RT instructions per the Operator and the optimization effort may ensure the unit is positioned to ensure any contractual terms are met while minimizing capital costs, for example.

In an example, the HMS may deliver DA and RT availability and pricing information for energy and capacity products to the Scheduling Coordinator (SC).

Figure 8:
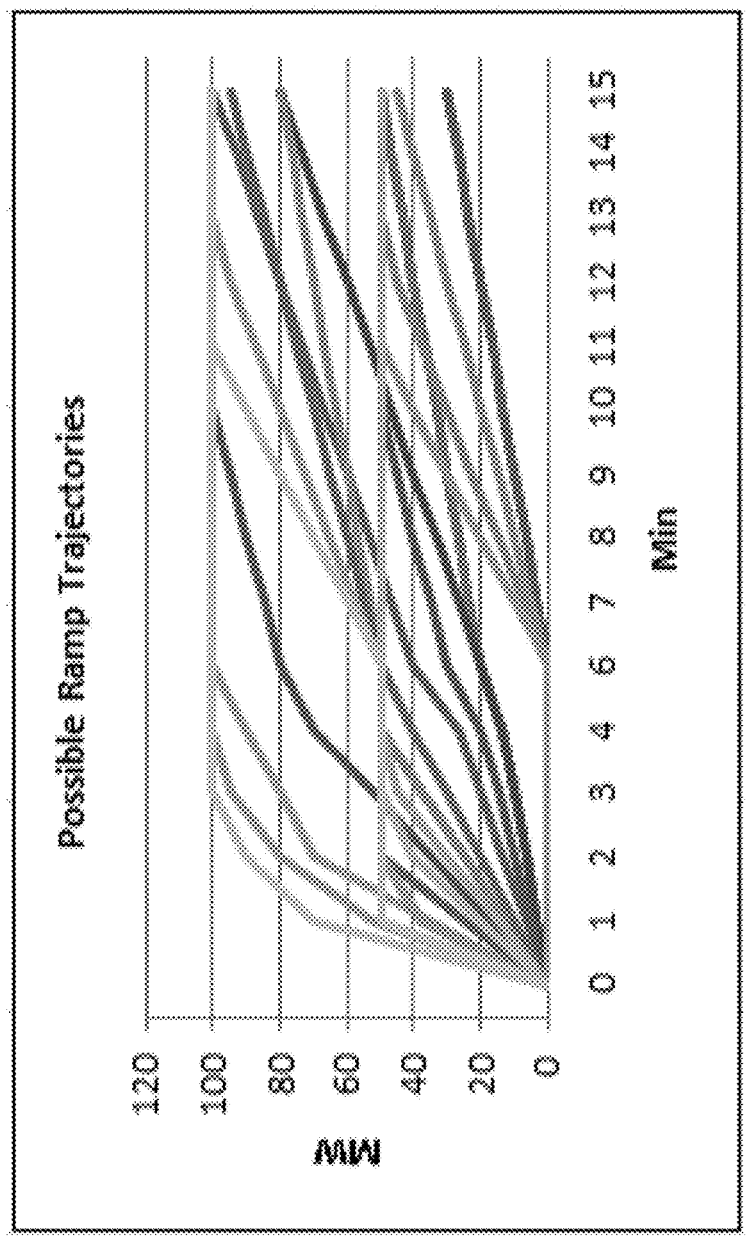
FIG. 8 is a plot of example ramp trajectories that may be implemented in a hybrid energy system.

Life-cycle costs can vary. For example, faster ramp rates can cost more than slower ramps. Therefore, the HMS may match the specific needs on a lowest emissions or least cost basis. The hybrid facility may include a number of ramping profiles depending whether the gas turbine is running or not and whether the response is from the GTG only, battery only, or a combined GTG and battery response. The fastest ramp rates may be reserved for primary frequency response and are a function of the gas turbine governor and battery inverter outside of and at a higher priority to the HMS optimizations. For example, Table 3 lists 25 exemplary ramping profiles, and FIG. 8 illustrates example ramp trajectories.

TABLE 3

Exemplary Ramping Profiles

| Ramp Rate MW/Min | Battery only | GTG only from S/D | GTG only from Pmin | Battery & GTG from GTG S/D | Battery and GT from GT Pmin |
|---|---|---|---|---|---|
| Lowest | 3.33 | 3.33 | 3.33 | 6.67 | 6.67 |
| Low | 12.50 | 3.33 | 5.00 | 15.83 | 17.50 |
| Med | 25.00 | 5.00 | 10.00 | 30.00 | 35.00 |
| High | 37.50 | 7.50 | 15.00 | 45.00 | 52.50 |
| Highest | 50.00 | 10.00 | 20.00 | 60.00 | 70.00 |

Primary frequency response may be dampened for a portion or the entire facility by the Power System Stabilizer (PSS). For all other products, the HMS may restrict the use of the gas-fired generation to only those periods where it is needed to support grid reliability or respond to user defined economic signals. The HMS may start and stop the gas turbine as required is such a way as to keep the output linear as required.

Figure 9:
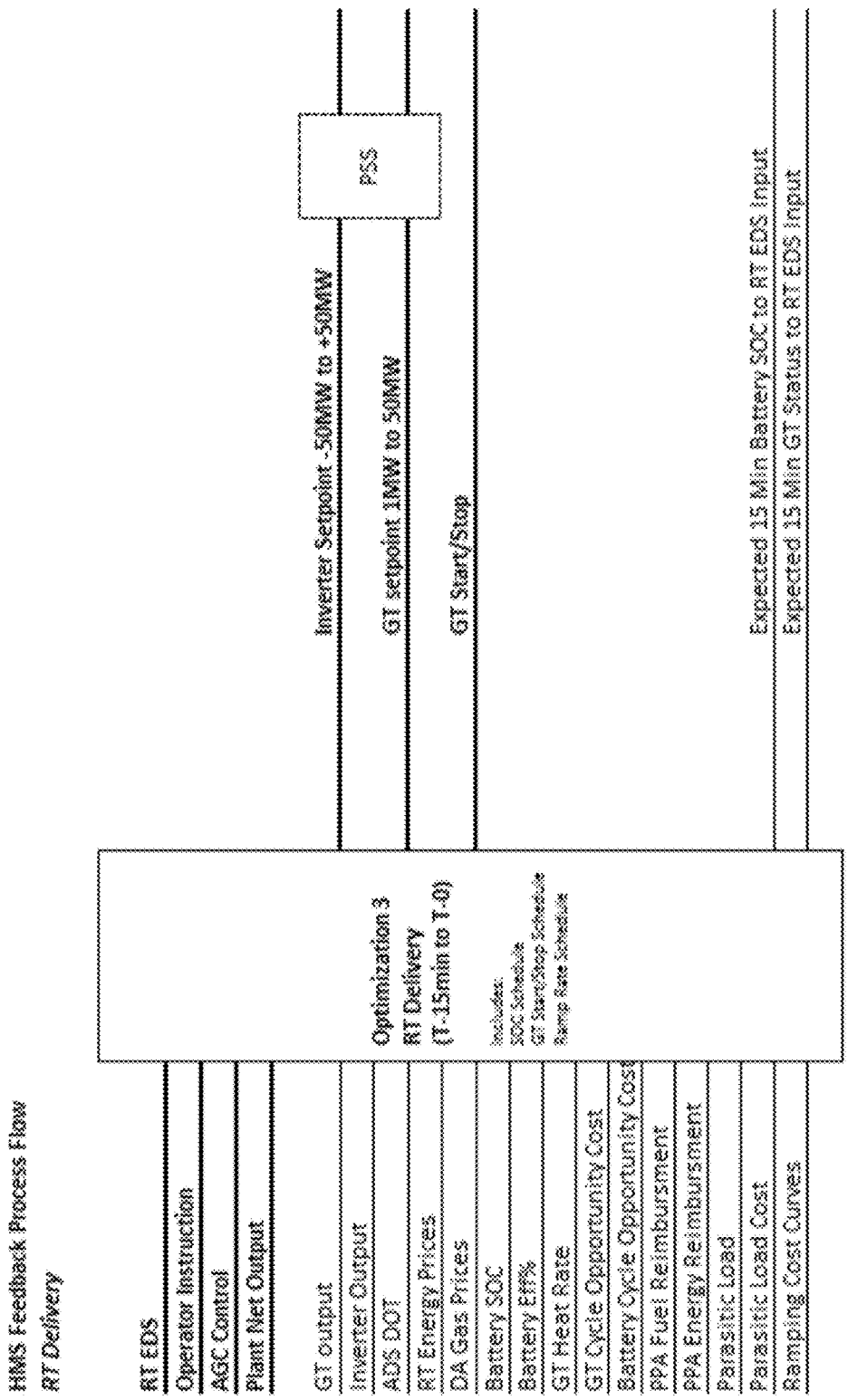
FIG. 9 is a process flow diagram of an example Hybrid Management System feedback process for providing real-time delivery of power.

The feedback loop of the HMS receives, as its primary inputs, the RT instruction from the Operator and the RT plant net output. A final optimization may be performed using a time horizon, such as a 5 minute time horizon, a 10 minute time horizon, a 15 minute time horizon, or a 20 minute or longer time horizon, as shown in FIG. 9. This final optimization may allow the HMS to correct for any deviations from the RT EDS and will issue the final outputs to the battery inverters and gas turbine necessary to meet the Operator instruction. During this optimization, the HMS will make the final decision and issue instructions to start and stop the gas turbine, charge the battery, and ramp the plant at specified ramp rates.

The batteries may be charged by the gas turbine during periods where a null output from facility is desired but the intertemporal value of gas fired generation will be needed in a later period either for reliability or economic energy. This null period can occur somewhat frequently for short durations of time, such as about 5 minutes to about 15 minutes, when the facility is at full load. If desired, the hybrid facility may respond to a short real time price drop such as those produced by variations from renewable resources, or overlapping ramps of thermal generation by simply directing all GT power to the battery, avoiding the cycle costs on the GT, until the event has concluded.

The HMS may optimize the energy delivery and SOC in such a way as to deliver energy in the least cost manner, but also for the longest period of time. For example, the HMS may use the RT EDS, current day gas prices and current RT energy prices to determine if a dispatch instruction to part load (50% for example) should be met by the battery only, the GT only, or a combination of battery and GT. Limiting the battery output in one interval will extend its ability to deliver in the next interval. In this example, the facility energy pricing may be viewed as either aggregate or individual pricing of battery and GT over the time horizon.

In another example, the HMS may determine whether the transition energy produced by the GT during its normal ramping should be delivered to the grid or to the battery in order to extend the battery range. This may be accomplished on both positive and negative ramps.

Products provided by the hybrid energy system may include: inertia or primary frequency response, voltage support, energy, capacity for flexible ramping (as required for renewable integration), preventive or corrective capacity, and ancillary services.

The HMS may manage the facility output based on a number of factors, including but not limited in scope or order:
1. Grid reliability
   a. Local Grid Reliability needs
      i. Primary frequency control
      ii. Secondary frequency control
      iii. Voltage support
      iv. Preventive Capacity (N-1)
      v. Corrective Capacity (N-1-1)
   b. Area Grid Reliability
      i. Ramping energy
      ii. Regulation
      iii. Spinning Reserve
2. Emissions Reductions
   a. The hybrid operating range allows the maximum headroom for green renewables operating as Variable Energy Resources (VER) to produce at their maximum output without curtailment. The hybrid facility may respond with negative or positive output to provide:
      i. Flexible ramping up during periods when VER output dips.
      ii. Flexible ramping down during periods where VER output increases.
3. Economic Energy.
   a. The hybrid operating range allows the maximum headroom for the lowest cost energy by responding in real time with negative or positive energy prices based upon:
      i. Arbitraged storage price—storage only output.
      ii. Aggregate arbitraged storage price and gas-fired heat rate—storage and gas-fired output.
      iii. Gas-fired heat rate—gas-fired output only.
      iv. Aggregate gas-fired heat rate gas-fired and storage output when storage was charged with gas fired generator.

The HMS may optimize on the maximum usage of the storage system that facilitates the minimum amount of gas burned from the gas turbine to meet the priorities of: 1) reliability, 2) emissions reductions, or 3) economic energy. This decision process may aid in meeting an off-take agreement or other contractual terms and conditions, while protecting investment (e.g., capital) in the hybrid energy system. This optimization may include at a minimum, the following inputs:
1. Primary frequency response demand from plant sensors and power system stabilizer.
2. Local area inertia need—discrete out of market schedule or dispatch by ISO,
3. Preventive capacity (N-1)—discrete out of market schedule or dispatch by ISO.
4. Corrective capacity (N-1-1)—discrete out of market schedule or dispatch by ISO.
5. Economic market signals.
   a. Day ahead and Real Time market pricing for energy and ancillary services.
   b. Day ahead Real Time load forecasts.
   c. DA and Real time Variable Energy Resource (VER) forecasts.
   d. Flexible ramping—intertemporal price signal to cover net load changes caused by VER.
6. Gas Prices Variable operating costs of hybrid facility.
7. Life cycle maintenance cost constraints—storage system.
   a. Life cycle maintenance cost constraints—gas-fired generation.

EXAMPLES

Example 1 can include subject matter (such as an apparatus, a method, a means for performing acts, or a machine readable medium including instructions that, when performed by the machine, that can cause the machine to perform acts), such as a hybrid energy system, comprising: a generator step-up transformer; a gas turbine generator (GTG) configured to provide a full-load power output; and a storage device configured to store energy, wherein the GTG and the storage device are electrically co-located on a low side of the generator step-up transformer.

Example 2 can include, or can optionally be combined with the subject matter of Example 1 to optionally include wherein the GTG is a fast start GTG.

Example 3 can include, or can optionally be combined with the subject matter of one or any combination of Examples 1 or 2 to optionally include wherein the storage device is configured to be charged by an electric grid if a grid market price is lower than a GTG charging cost.

Example 4 can include, or can optionally be combined with the subject matter of one or any combination of Examples 1-3 to optionally include wherein the storage device is configured to be charged by the GTG if a GTG charging cost is lower than a grid market cost.

Example 5 can include, or can optionally be combined with the subject matter of one or any combination of Examples 1-4 to optionally include wherein the hybrid energy system is configured to start the GTG from a standby state and ramp the GTG to a desired power output of the hybrid energy system in about 20 minutes or less, wherein the desired power output of the hybrid energy system is not greater than the full-load power output.

Example 6 can include, or can optionally be combined with the subject matter of one or any combination of Examples 1-5 to optionally include wherein the hybrid energy system is configured to ramp the GTG in response to a frequency disturbance.

Example 7 can include, or can optionally be combined with the subject matter of one or any combination of Examples 1-6 to optionally include wherein the GTG is off-line in the stand-by-state.

Example 8 can include, or can optionally be combined with the subject matter of one or any combination of Examples 1-7 to optionally include wherein the storage device is configured to be charged by an electric grid.

Example 9 can include, or can optionally be combined with the subject matter of one or any combination of Examples 1-8 to optionally include wherein the storage device has as stored energy capacity at least about 5% of the full-load power output up to about 100% of the full-load power output.

Example 10 can include, or can optionally be combined with the subject matter of one or any combination of Examples 1-9 to optionally include wherein the storage device includes an inverter-rectifier having stored energy of at least about 10% of the full-load power output.

Example 11 can include, or can optionally be combined with the subject matter of one or any combination of Examples 1-10 to optionally include wherein the total hybrid energy system is configured to start the GTG from the stand-by state to the desired power output of the hybrid energy system and discharge at least a portion of the stored energy of the storage device at a hybrid ramp rate that substantially matches in a gas-turbine alone ramp rate.

Example 12 can include, or can optionally be combined with the subject matter of one or any combination of Examples 1-11 to optionally include a ramping profile of the hybrid energy system continually increases until the desired power output of the hybrid energy system is obtained.

Example 13 can include, or can optionally be combined with the subject matter of one or any combination of Examples 1-12 to optionally include wherein a state of charge of the storage device is configured to vary less than 5% during operation of the hybrid energy system.

Example 14 can include, or can optionally be combined with the subject matter of one or any combination of Examples 1-13 to optionally include wherein a stored energy capacity of the storage device is at least equal to the full-load power output of the GTG.

Example 15 can include, or can optionally be combined with the subject matter of one or any combination of Examples 1-14 to optionally include wherein the stored energy capacity of the storage device has at least about 1 hour of stored energy discharge beyond the full-load power output of the GTG.

Example 16 can include, or can optionally be combined with the subject matter of one or any combination of Examples 1-15 to optionally include wherein the storage device is configured to respond before the GTG when an event is detected during the operation of the hybrid energy system.

Example 17 can include, or can optionally be combined with the subject matter of one or any combination of Examples 1-16 to optionally include wherein the hybrid energy system is configured to respond to an electric grid demand.

Example 18 can include, or can optionally be combined with the subject matter of one or any combination of Examples 1-17 to optionally include wherein hybrid energy system is configured to respond to the electric grid demand without producing any pollutants.

Example 19 can include subject matter (such as an apparatus, a method, a means for performing acts, or a machine readable medium including instructions that, when performed by the machine, that can cause the machine to perform acts), such as a hybrid energy system, comprising: a generator step-up transformer; a gas turbine generator (GTG) configured to provide a full-load power output and having a minimum power output of less than 5% of the full-load power output; and a storage device configured to store energy, wherein: the GTG and the storage device are electrically co-located on a low side of the generator step-up transformer, and a stored energy capacity of the storage device is at least about 5% of the full-load power output up to about 100% of the full-load power output.

Example 20 can include subject matter (such as an apparatus, a method, a means for performing acts, or a machine readable medium including instructions that, when performed by the machine, that can cause the machine to perform acts), such as a hybrid energy system, comprising: a generator step-up transformer; a gas turbine generator (GTG) configured to provide a full-load power output; and a storage device configured to store energy, wherein: the GTG and the storage device are electrically co-located on a low side of the generator step-up transformer, the storage device is configured to be charged based on at least one market factor, and the hybrid energy system is configured to provide a substantially emissions free ramping of energy.

Each of these non-limiting examples can stand on its own, or can be combined in any permutation or combination with any one or more of the other examples.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls. In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The term "substantially simultaneously" or "substantially immediately" or "substantially instantaneously" refers to events occurring at approximately the same time. It is contemplated by the inventor that response times can be limited by mechanical, electrical, or chemical processes and system. Substantially simultaneously, substantially immediately, or substantially instantaneously can include time periods 1 minute or less, 45 seconds or less, 30 seconds or less, 20 seconds or less, 15 seconds or less, 10 seconds or less, 5 seconds or less, 3 seconds or less, 2 seconds or less, 1 second or less, 0.5 seconds or less, or 0.1 seconds or less.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. .sctn.1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A method for controlling a hybrid energy system including a step-up transformer, a gas turbine generator configured to output alternating current (AC) power to the step-up transformer, an energy storage system, an inverter-rectifier configured to received direct current (DC) from the energy storage system and output AC power to the step-up transformer, and a hybrid management system (HMS) coupled to the gas turbine generator, energy storage system and inverter-rectifier and configured to govern a ramp rate of net plant output, the method comprising:

determining, by the HMS, an expected delivery schedule from at least one of market awards and schedules provided by an operator;

determining, by the HMS, timing for charging the storage device based upon the expected delivery schedule;

determining, by the HMS, a least cost method of delivering energy produced by the hybrid energy system based upon the expected delivery schedule;

governing, by the HMS, a charge state of the energy storage system based upon the determined least cost method of delivering energy produced by the hybrid energy system;

starting or stopping the gas turbine generator based upon the determined least cost method of delivering energy produced by the hybrid energy system and on real time instructions from the operator; and governing, by the HMS, a ramp rate of net output power of the hybrid energy system when starting the gas turbine generator.

2. The method of claim 1, wherein:

determining, by the HMS, the least cost method of delivering energy produced by the gas turbine generator based upon the expected delivery schedule comprises shutting down the gas turbine generator when no net output power is to be delivered; and governing, by the HMS, a ramp rate of net output power of the hybrid energy system when starting the gas turbine generator comprises responding, by the HMS, to an increasing desired load transient event when the gas turbine generator is initially stopped by discharging a portion of the stored energy capacity of the energy storage system while the gas turbine generator is starting such that the net output power of the hybrid energy system follows a ramping profile continuously increasing toward the desired load at a hybrid ramp rate that substantially matches a gas-turbine generator ramp up rate as if the gas turbine generator were running in an on-line mode at the start of the transient event.

3. The method of claim 1, wherein governing, by the HMS, a charge state of the energy storage system based upon the determined least cost method of delivering energy produced by the hybrid energy system comprises charging the energy storage system by an electric grid if a grid market cost is lower than a gas turbine generator charging cost.

4. The method of claim 1, wherein governing, by the HMS, a charge state of the energy storage system based upon the determined least cost method of delivering energy produced by the hybrid energy system comprises charging the energy storage system by the gas turbine generator if a grid market cost is higher than a gas turbine generator charging cost.

5. The method of claim 1, wherein governing, by the HMS, a charge state of the energy storage system based upon the determined least cost method of delivering energy produced by the hybrid energy system comprises the HMS discharging the energy storage system to respond to an increased grid power demand before the gas turbine generator can respond and to operate the gas turbine generator at a power level greater than the grid power demand sufficient to recharge the energy storage system so that the state of charge of the energy storage system varies less than 5% during operation of the hybrid energy system.

* * * * *